United States Patent
Igari

(10) Patent No.: US 12,497,042 B2
(45) Date of Patent: Dec. 16, 2025

(54) CONTROLLER AND CONTROL METHOD FOR DRIVER-ASSISTANCE SYSTEM USED IN MOTORCYCLE, AND DRIVER-ASSISTANCE SYSTEM USED IN MOTORCYCLE

(71) Applicant: Robert Bosch GmbH, Stuttgart (DE)

(72) Inventor: Yoshihide Igari, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 938 days.

(21) Appl. No.: 17/257,638

(22) PCT Filed: Jun. 26, 2019

(86) PCT No.: PCT/IB2019/055378
§ 371 (c)(1),
(2) Date: Jan. 4, 2021

(87) PCT Pub. No.: WO2020/008302
PCT Pub. Date: Jan. 9, 2020

(65) Prior Publication Data
US 2021/0276552 A1    Sep. 9, 2021

(30) Foreign Application Priority Data

Jul. 4, 2018 (JP) ................. 2018-127300

(51) Int. Cl.
*B60W 30/16* (2020.01)
*B60W 50/14* (2020.01)

(52) U.S. Cl.
CPC ............ *B60W 30/16* (2013.01); *B60W 50/14* (2013.01); *B60W 2300/36* (2013.01); *B60W 2520/16* (2013.01)

(58) Field of Classification Search
CPC ....... B60W 2050/143; B60W 2300/36; B60W 2520/105; B60W 2520/16; B60W 30/16
See application file for complete search history.

(56) References Cited

U.S. PATENT DOCUMENTS 6,397,133 B1 * 5/2002 van der Pol ........ B60R 21/0132
340/440
2005/0168328 A1 * 8/2005 Kitterer .............. B60K 31/0008
340/435

(Continued)

FOREIGN PATENT DOCUMENTS

| EP | 3048025 A1 | 7/2016 |
| EP | 3196089 A1 | 7/2017 |
| JP | 2009116882 A | 5/2009 |

OTHER PUBLICATIONS

International Search Report and Written Opinion for Application No. PCT/IB2019/055378 dated Oct. 16, 2019 (10 pages).

*Primary Examiner* — Charles J Han
(74) *Attorney, Agent, or Firm* — Michael Best & Friedrich LLP

(57) ABSTRACT

The present invention obtains a controller and a control method capable of appropriately assisting with an operation by a rider. The present invention also obtains a driver-assistance system including such a controller.
A controller (60) for a driver-assistance system (10) used for a motorcycle includes: a relevant information acquisition section (65) that acquires information relevant to automatic deceleration generated during adaptive cruise operation; and a notification control section (66) that makes a notification device (70) execute notification operation to the rider in the case where the information relevant to the automatic deceleration, which is acquired by the relevant information acquisition section (65), satisfies a determination criteria.

9 Claims, 3 Drawing Sheets

(56) References Cited

U.S. PATENT DOCUMENTS

2011/0163516 A1     7/2011   Whinnery
2014/0336892 A1   11/2014   Braunberger
2016/0214609 A1*   7/2016   Yamaoka .......... B60W 30/0956
2017/0144665 A1*   5/2017   Ohashi .................... F02D 29/02

\* cited by examiner

[FIG. 1]
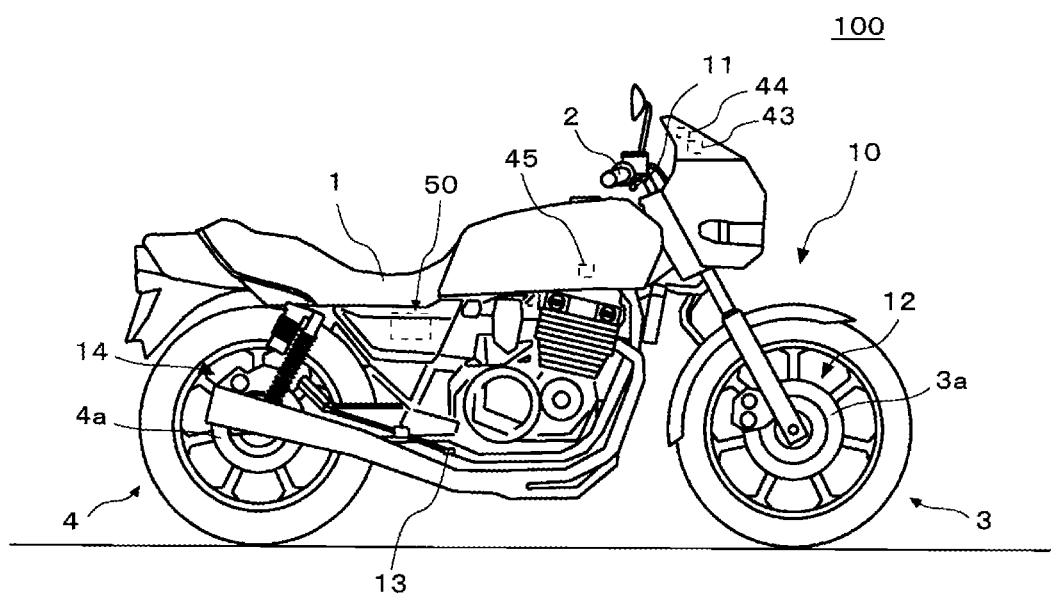

[FIG. 2]
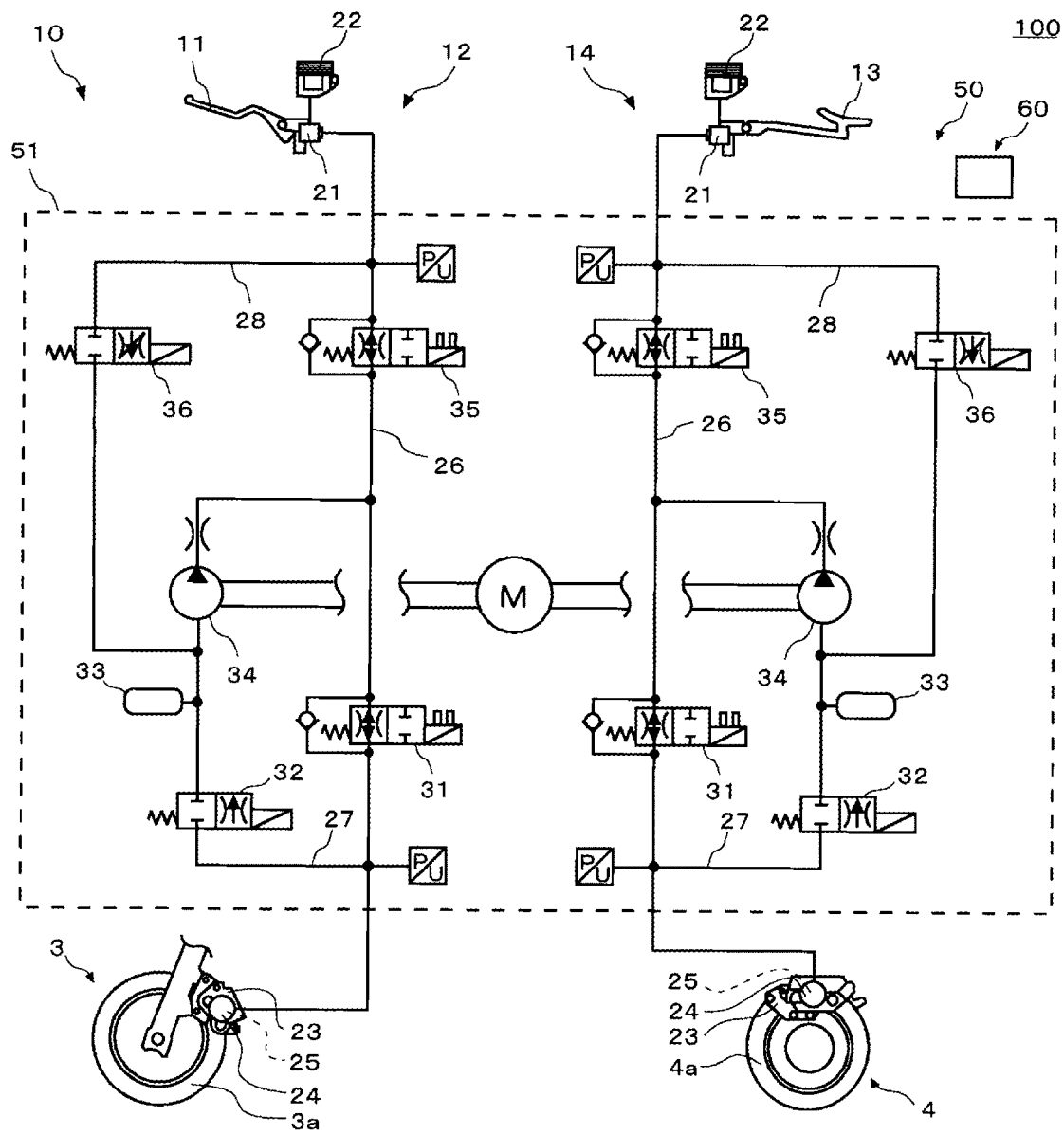

[FIG. 3]
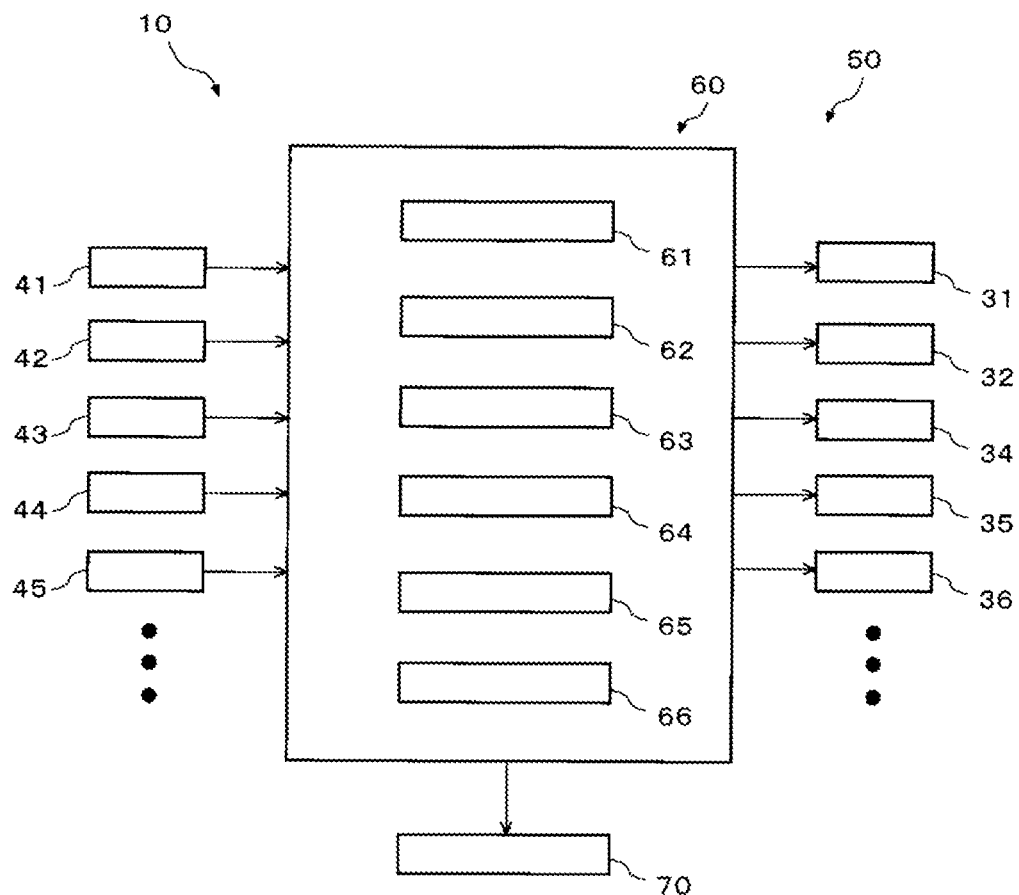
[FIG. 4]
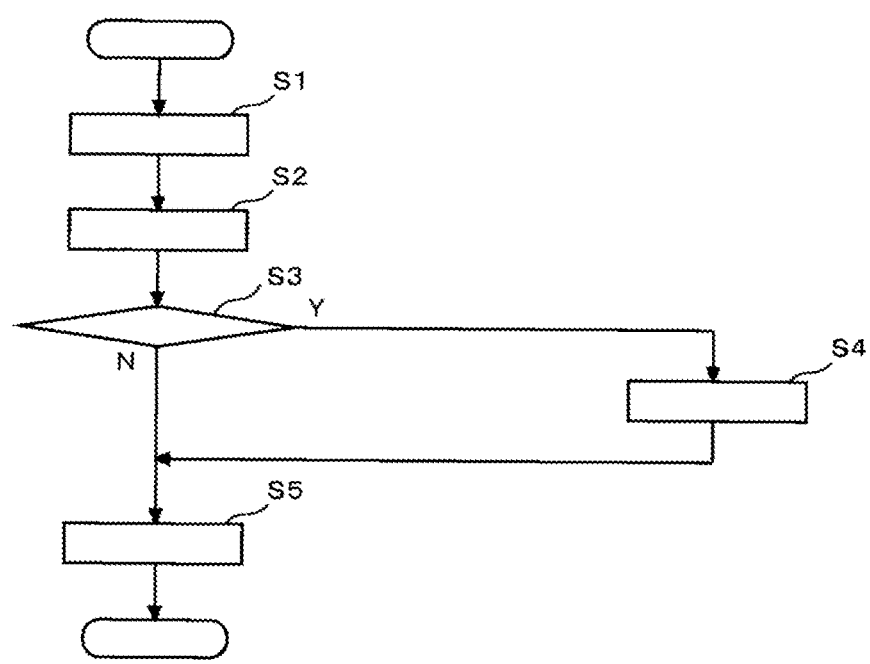

CONTROLLER AND CONTROL METHOD FOR DRIVER-ASSISTANCE SYSTEM USED IN MOTORCYCLE, AND DRIVER-ASSISTANCE SYSTEM USED IN MOTORCYCLE

BACKGROUND OF THE INVENTION

The present invention relates to a controller and a control method capable of appropriately assisting with an operation of a motorcycle by a rider and to a driver-assistance system including such a controller.

As a conventional technique related to a motorcycle (a two-wheeled motor vehicle or a three-wheeled motor vehicle), a technique of assisting with an operation by a rider is available. For example, a driver-assistance system is disclosed in JP-A-2009-116882. Based on output of a sensor that detects an obstacle present in a travel direction or substantially in the travel direction, the driver-assistance system notifies the rider that the motorcycle inappropriately approaches the obstacle.

By the way, in order to assist with the operation by the rider, it is considered to make the motorcycle execute automatic cruise operation. In the automatic cruise operation, behavior of the motorcycle is controlled such that a travel speed of the motorcycle approximates a speed reference value. In addition, in adaptive cruise operation that is a mode of the automatic cruise operation, a preceding vehicle on a lane where the motorcycle travels is identified as a follow-up vehicle, relative position information between the motorcycle and the follow-up vehicle is acquired, and the behavior of the motorcycle is controlled such that an inter-vehicular distance from the motorcycle to the follow-up vehicle approximates a distance reference value. In the adaptive cruise operation, deceleration that is generated on the motorcycle during automatic deceleration in the operation is restricted to such a magnitude of the deceleration that does not impair comfort of the rider.

The adaptive cruise operation that is executed in wide vehicles (for example, four-wheeled passenger vehicles, four-wheeled trucks, and the like) has already been widespread, and various techniques thereof have already been established. However, a technique of the adaptive cruise operation that is executed in the motorcycle has not been established. For example, the wide vehicle is allowed to change the travel lane relatively freely even during the automatic deceleration when the driver manipulates a steering wheel. Meanwhile, the travel direction of the motorcycle is changed by shifting weight of the rider. In addition, depending on a distribution state of a braking force to front and rear wheels, a force in a direction to lift a vehicle body may act on the motorcycle. Thus, it is relatively difficult to change the travel lane of the motorcycle during the automatic deceleration. In other words, in the adaptive cruise operation of the motorcycle, such a magnitude of the automatic deceleration that causes the rider to feel uncomfortable may have to be permitted. Thus, it is considered that unique control specialized in the adaptive cruise operation of the motorcycle has to be introduced.

SUMMARY OF THE INVENTION

The present invention has been made with the above-described problem as the background and therefore obtains a controller and a control method capable of appropriately assisting with an operation by a rider. The present invention also obtains a driver-assistance system including such a controller.

Solution to Problem

The present invention relates to a controller for a driver-assistance system used for a motorcycle, includes: a control amount setting section that sets a control amount in adaptive cruise operation in which the motorcycle travels at a speed corresponding to an inter-vehicular distance from the motorcycle to a preceding vehicle; and an execution section that makes the motorcycle execute the adaptive cruise operation corresponding to the control amount set by the control amount setting section, and further includes: a relevant information acquisition section that acquires information relevant to automatic deceleration generated during the adaptive cruise operation; and a notification control section that makes a notification device execute notification operation to a rider in the case where the information relevant to the automatic deceleration, which is acquired by the relevant information acquisition section, satisfies a determination criteria.

The present invention also relates to a driver-assistance system used for a motorcycle, and includes the controller and the notification device.

The present invention further relates to a control method for a driver-assistance system used for a motorcycle, includes: a control amount setting step of setting a control amount in adaptive cruise operation in which the motorcycle travels at a speed corresponding to an inter-vehicular distance from said motorcycle to a preceding vehicle; and an execution step of making the motorcycle execute the adaptive cruise operation corresponding to the control amount set in the control amount setting step, and further includes: a relevant information acquisition step of acquiring information relevant to automatic deceleration generated during the adaptive cruise operation; and a notification control step of making a notification device execute notification operation to a rider in the case where the information relevant to the automatic deceleration, which is acquired in the relevant information acquisition step, satisfies a determination criteria.

Advantageous Effects of Invention

In the present invention, the information relevant to the automatic deceleration generated during the adaptive cruise operation is acquired. In the case where the information satisfies the determination criteria, the notification device executes the notification operation to the rider. That is, even in the case where such a magnitude of the automatic deceleration that causes the rider to feel uncomfortable is generated on the motorcycle during the adaptive cruise operation, it is possible to reduce a negative influence on comfort actually received by the rider by improving predictive performance realized by the notification operation of the notification device. Thus, in the adaptive cruise operation, the motorcycle can be decelerated in various modes. Therefore, it is possible to appropriately assist with the operation by the rider.

BRIEF DESCRIPTION OF DRAWINGS

FIG. 1 is a view of a configuration of a motorcycle to which a driver-assistance system according to an embodiment of the present invention is applied.

FIG. 2 is a diagram illustrating the driver-assistance system according to the embodiment of the present invention.

FIG. 3 is a system configuration diagram of a main section of the driver-assistance system according to the embodiment of the present invention.

FIG. 4 is a flowchart illustrating operation of a controller in the driver-assistance system according to the embodiment of the present invention.

DETAILED DESCRIPTION

A description will hereinafter be made on an example of a controller, a driver-assistance system, and a control method according to the present invention with reference to the drawings.

Note that a term "motorcycle" means a two-wheeled motor vehicle or a three-wheeled motor vehicle among straddle-type vehicles straddled by riders. A configuration and operation, which will be described in the following embodiment, merely constitute one example. The present invention is not limited to the configuration and the operation, which will be described in the following embodiment. For example, the following description will be made on a case where the motorcycle is the two-wheeled motor vehicle. However, the motorcycle may be the three-wheeled motor vehicle. In addition, the following description will be made on a case where the driver-assistance system includes two wheel cylinders. However, the driver-assistance system may include the wheel cylinders in a different number.

In the drawings, the same or similar members or portions will be denoted by the same reference signs. A detailed structure will appropriately be illustrated in a simplified manner or will not be illustrated. If it is desired to indicate a component that is not illustrated in any of the drawings, a broken lead line is used to indicate such a component.

Embodiment

A description will hereinafter be made on an example of a driver-assistance system according to an embodiment and a motorcycle, to which the driver-assistance system is applied.

<Configuration of Driver-Assistance System>

FIG. 1 is a view of a configuration of the motorcycle to which the driver-assistance system according to the embodiment of the present invention is applied. FIG. 2 is a diagram illustrating the driver-assistance system according to the embodiment of the present invention. FIG. 3 is a system configuration diagram of a main section of the driver-assistance system according to the embodiment of the present invention.

As illustrated in FIG. 1 and FIG. 2, at least a part of a driver-assistance system 10 is mounted on a motorcycle 100. The motorcycle 100 includes: a trunk 1; a handlebar 2 that is held in a freely turnable manner by the trunk 1; a front wheel 3 that is held in a freely turnable manner with the handlebar 2 by the trunk 1; and a rear wheel 4 that is held in a freely rotatable manner by the trunk 1.

The driver-assistance system 10 includes: a front brake operation section 11; a front-wheel brake mechanism 12 that brakes the front wheel 3 in an interlocking manner with at least the front brake operation section 11; a rear brake operation section 13; and a rear-wheel brake mechanism 14 that brakes the rear wheel 4 in an interlocking manner with at least the rear brake operation section 13.

The front brake operation section 11 is provided on the handlebar 2 and is operated by a user's hand. The front brake operation section 11 is a brake lever, for example. The rear brake operation section 13 is provided in a lower portion of the trunk 1 and is operated by the user's foot. The rear brake operation section 13 is a brake pedal, for example.

Each of the front-wheel brake mechanism 12 and the rear-wheel brake mechanism 14 includes: a master cylinder 21 in which a piston (not illustrated) is installed; a reservoir 22 that is attached to the master cylinder 21; a brake caliper 23 that is held by the trunk 1 and is provided with a brake pad 25; a wheel cylinder 24 that is provided in the brake caliper 23; a primary channel 26 through which a brake fluid in the master cylinder 21 is delivered to the wheel cylinder 24; a secondary channel 27 through which the brake fluid in the wheel cylinder 24 is released; and a supply channel 28 through which the brake fluid in the master cylinder 21 is supplied to the secondary channel 27.

An inlet valve (EV) 31 is provided in the primary channel 26. The secondary channel 27 bypasses a portion of the primary channel 26 between the wheel cylinder 24 side and the master cylinder 21 side from the inlet valve 31. The secondary channel 27 is sequentially provided with an outlet valve (AV) 32, an accumulator 33, and a pump 34 from an upstream side. Between an end of the primary channel 26 on the master cylinder 21 side and a portion of the primary channel 26 to which a downstream end of the secondary channel 27 is connected, a first valve (USV) 35 is provided. The supply channel 28 communicates between the master cylinder 21 and a suction side of the pump 34 in the secondary channel 27. A second valve (HSV) 36 is provided in the supply channel 28.

The inlet valve 31 is an electromagnetic valve that is opened in an unenergized state and closed in an energized state, for example. The outlet valve 32 is an electromagnetic valve that is closed in an unenergized state and opened in an energized state, for example. The first valve 35 is an electromagnetic valve that is opened in an unenergized state and is closed in an energized state, for example. The second valve 36 is an electromagnetic valve that is closed in an unenergized state and is opened in an energized state, for example.

A hydraulic pressure control unit 50 is configured to include: members such as the inlet valves 31, the outlet valves 32, the accumulators 33, the pumps 34, the first valves 35, and the second valves 36; a base body 51 that is provided with those members and is formed with channels constituting the primary channels 26, the secondary channels 27, and the supply channels 28 therein; and a controller (ECU) 60. In the driver-assistance system 10, the hydraulic pressure control unit 50 is a unit that has a function of controlling a hydraulic pressure of the brake fluid in the wheel cylinder 24, that is, a braking force on the front wheel 3 that is generated by the front-wheel brake mechanism 12 and a braking force on the rear wheel 4 that is generated by the rear-wheel brake mechanism 14.

The members may collectively be provided in the single base body 51 or may separately be provided in the multiple base bodies 51. In addition, the controller 60 may be provided as a single unit or may be divided into multiple units. Furthermore, the controller 60 may be attached to the base body 51 or may be attached to the member other than the base body 51.

As illustrated in FIG. 1 and FIG. 3, the driver-assistance system 10 includes a front-wheel rotational frequency sensor 41, a rear-wheel rotational frequency sensor 42, a distance measurement sensor 43, an image sensor 44, and an inertial measurement unit (IMU) 45.

The front-wheel rotational frequency sensor 41 detects a rotational frequency of the front wheel 3. The front-wheel rotational frequency sensor 41 may detect another physical quantity that can substantially be converted into the rotational frequency of the front wheel 3. The rear-wheel rotational frequency sensor 42 detects a rotational frequency of the rear wheel 4. The rear-wheel rotational frequency sensor 42 may detect another physical quantity that can substantially be converted into the rotational frequency of the rear wheel 4.

In a state of facing forward, the distance measurement sensor 43 is attached to a front portion of the motorcycle 100. The distance measurement sensor 43 is a radar, a Lidar, an ultrasonic sensor, a stereovision sensor, or the like, for example, and detects a distance and an orientation from the motorcycle 100 to an object ahead.

In a state of facing forward, the image sensor 44 is attached to the front portion of the motorcycle 100. The image sensor 44 can be any sensor as long as the sensor can learn a travel lane of the motorcycle 100 and a positional relationship between the motorcycle 100 and a preceding vehicle. Note that the distance measurement sensor 43 may have the functions of the image sensor 44, and, in such a case, the image sensor 44 may not be provided.

The inertial measurement unit 45 includes a three-axis gyroscope sensor and a three-directional acceleration sensor, for example. That is, the inertial measurement unit 45 detects an angular velocity and acceleration generated on the traveling motorcycle 100. The inertial measurement unit 45 may detect another physical quantity that can substantially be converted into the angular velocity and may detect another physical quantity that can substantially be converted into the acceleration.

As illustrated in FIG. 3, the controller 60 includes a follow-up vehicle identification section 61, a vehicle position information acquisition section 62, a control amount setting section 63, an execution section 64, relevant information acquisition section 65, and a notification control section 66. The controller 60 may partially or entirely be constructed of a microcomputer, a microprocessor unit, or the like, may be constructed of a member in which firmware or the like can be updated, or may be a program module or the like that is executed by a command from a CPU or the like, for example.

The controller 60 receives output of the various sensors (a master-cylinder pressure sensor, a wheel-cylinder pressure sensor, the front-wheel rotational frequency sensor 41, the rear-wheel rotational frequency sensor 42, the distance measurement sensor 43, the image sensor 44, the inertial measurement unit 45, and the like). In addition, the controller 60 outputs a signal to each component of the driver-assistance system 10 (each component of the hydraulic pressure control unit 50, each component used to control engine output, and the like), so as to control behavior of the motorcycle 100.

More specifically, in normal brake control, the controller 60 controls the inlet valves 31, the outlet valves 32, the first valves 35, and the second valves 36 as follows. The normal brake control is control to generate the braking force, an amount of which corresponds to an operation amount of the front brake operation section 11, on the front wheel 3 when the front brake operation section 11 is operated. In addition, the normal brake control is control to generate the braking force, the amount of which corresponds to an operation amount of the rear brake operation section 13, on the rear wheel 4 when the rear brake operation section 13 is operated.

In the normal brake control, the controller 60 opens the inlet valves 31, closes the outlet valves 32, opens the first valves 35, and closes the second valves 36. When the front brake operation section 11 is operated in such a state, in the front-wheel brake mechanism 12, the piston (not illustrated) in the master cylinder 21 is pressed to increase the hydraulic pressure of the brake fluid in the wheel cylinder 24, and the brake pad 25, which is provided in the brake caliper 23, is pressed against a rotor 3a of the front wheel 3. In this way, the braking force is generated on the front wheel 3, and the front wheel 3 is thereby braked. Meanwhile, when the rear brake operation section 13 is operated, in the rear-wheel brake mechanism 14, the piston (not illustrated) in the master cylinder 21 is pressed to increase the hydraulic pressure of the brake fluid in the wheel cylinder 24, and the brake pad 25, which is provided in the brake caliper 23, is pressed against a rotor 4a of the rear wheel 4. In this way, the braking force is generated on the rear wheel 4, and the rear wheel 4 is thereby braked.

The controller 60 can execute adaptive cruise operation. The adaptive cruise operation is a mode of automatic cruise operation. In the automatic cruise operation, the engine output and the braking forces generated on the wheels (the front wheel 3 and the rear wheel 4) are controlled such that a travel speed of the motorcycle 100 approximates a speed reference value. In this way, the motorcycle 100 is automatically accelerated or decelerated. The adaptive cruise operation is executed when the preceding vehicle is identified as a follow-up vehicle during the execution of the automatic cruise operation. In the adaptive cruise operation, the engine output and the braking forces generated on the wheels (the front wheel 3 and the rear wheel 4) are controlled such that an inter-vehicular distance from the motorcycle 100 to the follow-up vehicle approximates a distance reference value. In this way, the motorcycle 100 is automatically accelerated or decelerated. In the adaptive cruise operation, upper limit values are set for target acceleration of the motorcycle 100, which is set at the time of the automatic acceleration, and target deceleration of the motorcycle 100, which is set at the time of the automatic deceleration. Each of those upper limit values is preferably a value at which comfort of the rider is not significantly impaired.

The follow-up vehicle identification section 61 identifies the follow-up vehicle on the basis of the output of the distance measurement sensor 43 and the image sensor 44. More specifically, of the preceding vehicles located within a detection range of the distance measurement sensor 43, the preceding vehicle that is located on the travel lane of the motorcycle 100 and has the shortest distance from the motorcycle 100 is identified as the follow-up vehicle.

Based on the output of the distance measurement sensor 43, the vehicle position information acquisition section 62 acquires vehicle position information that is relative position information of the follow-up vehicle to the traveling motorcycle 100. More specifically, the vehicle position information acquisition section 62 acquires, as the vehicle position information, the inter-vehicular distance between the motorcycle 100 and the follow-up vehicle.

The control amount setting section 63 sets a control amount in the adaptive cruise operation on the basis of the vehicle position information acquired by the vehicle position information acquisition section 62 and the output of the front-wheel rotational frequency sensor 41 and the rear-wheel rotational frequency sensor 42. More specifically, the control amount setting section 63 sets such a control amount that the inter-vehicular distance between the motorcycle 100 and the follow-up vehicle in a travel direction of the motorcycle 100 approximates the distance reference value. As the distance from the motorcycle 100 to the follow-up vehicle, the distance reference value is set to a value with which safety of the rider can be secured. In addition, the control amount setting section 63 sets such a control amount that the travel speed of the motorcycle 100 does not exceed the speed reference value. For example, the speed reference value can appropriately be set by the rider. In the case where the follow-up vehicle is not identified by the follow-up vehicle identification section 61, the control amount setting section 63 sets such a control amount that the travel speed of the motorcycle 100 approximates the speed reference value.

The execution section 64 executes the adaptive cruise operation that corresponds to the control amount set by the control amount setting section 63. For example, in the adaptive cruise operation, the execution section 64 controls the components of the driver-assistance system 10 to increase the engine output, and thereby executes the automatic acceleration. In addition, for example, in the adaptive cruise operation, the execution section 64 controls the components of the driver-assistance system 10 to increase the braking forces generated on the wheels (the front wheel 3 and the rear wheel 4), and thereby executes the automatic deceleration. When executing the automatic deceleration, the execution section 64 operates the inlet valves 31, the outlet valves 32, the first valves, 35, the second valves 36, and the pumps 34 with the control amount set by the control amount setting section 63, so as to control the deceleration generated on the motorcycle 100.

For example, the controller 60 controls the inlet valves 31, the outlet valves 32, the first valves 35, the second valves 36, and the pumps 34 as follows. In order to generate the braking force on the front wheel 3, the controller 60 drives the pump 34 in a state where the inlet valve 31 is opened, the outlet valve 32 is closed, the first valve 35 is closed, and the second valve 36 is opened in the front-wheel brake mechanism 12. In addition, in order to generate the braking force on the rear wheel 4, the controller 60 drives the pump 34 in a state where the inlet valve 31 is opened, the outlet valve 32 is closed, the first valve 35 is closed, and the second valve 36 is opened in the rear-wheel brake mechanism 14.

During the adaptive cruise operation, the controller 60 can execute notification operation to the rider by outputting a signal to a notification device 70 in accordance with the output of the various sensors (the master-cylinder pressure sensor, the wheel-cylinder pressure sensor, the front-wheel rotational frequency sensor 41, the rear-wheel rotational frequency sensor 42, the distance measurement sensor 43, the image sensor 44, the inertial measurement unit 45, and the like).

The relevant information acquisition section 65 acquires information relevant to the automatic deceleration that is generated during the adaptive cruise operation. The information relevant to the automatic deceleration may be information relevant to the automatic deceleration generated at the time point or may be information relevant to the automatic deceleration to be generated in the future.

The notification control section 66 determines whether the information relevant to the automatic deceleration, which is acquired by the relevant information acquisition section 65, satisfies a determination criteria. If the determination criteria is satisfied, the notification control section 66 outputs a signal that makes the notification device 70 execute the notification operation.

For example, the information relevant to the automatic deceleration includes the deceleration of the motorcycle 100 in the automatic deceleration generated during the adaptive cruise operation. The relevant information acquisition section 65 may acquire the deceleration generated at the time point on the basis of the output of the front-wheel rotational frequency sensor 41 and the rear-wheel rotational frequency sensor 42, or may acquire the deceleration to be generated in the future on the basis of the control amount set by the control amount setting section 63. In the case where the deceleration is higher than a reference value, the notification control section 66 outputs the signal that makes the notification device 70 execute the notification operation. Needless to say, the reference value is lower than an upper limit value of the target deceleration of the motorcycle 100, which is set at the time of the automatic deceleration. In addition, in the case where a change amount of the deceleration is larger than a reference value, the notification control section 66 outputs the signal that makes the notification device 70 execute the notification operation.

For example, the information relevant to the automatic deceleration includes a pitch angle or a pitch angular velocity of the motorcycle 100 in the automatic deceleration generated during the adaptive cruise operation. The relevant information acquisition section 65 preferably acquires the pitch angle or the pitch angular velocity generated at the time point on the basis of the output of the inertial measurement unit 45. In the case where the pitch angle or the pitch angular velocity is larger than a reference value, the notification control section 66 outputs the signal that makes the notification device 70 execute the notification operation. Alternatively, in the case where a change amount of the pitch angle or the pitch angular velocity is larger than a reference value, the notification control section 66 outputs the signal that makes the notification device 70 execute the notification operation.

For example, the information relevant to the automatic deceleration includes peripheral environment information of the motorcycle 100 that influences the automatic deceleration generated during the adaptive cruise operation. The relevant information acquisition section 65 preferably acquires a lit state of a brake lamp of the preceding vehicle on the basis of the output of the image sensor 44. In the case where the brake lamp of the preceding vehicle is lit, the notification control section 66 outputs the signal that makes the notification device 70 execute the notification operation. Alternatively, In the case where lighting of the brake lamp of the preceding vehicle continues for reference duration or longer, the notification control section 66 outputs the signal that makes the notification device 70 execute the notification operation.

The notification device 70 may notify the rider by sound, may notify the rider by a display, may notify the rider by vibrations, or may notify the rider by a combination of any of those. That is, the notification device 70 may execute the notification operation that does not exert an external force on the rider, or may execute the notification operation that exerts the external force on the rider. More specifically, the notification device 70 is a speaker, a display, a lamp, a vibrator, or the like. In addition, the notification device 70 may be provided on the motorcycle 100 or may be provided in an accessory such as a helmet that is associated with the motorcycle 100. Furthermore, the notification device 70 may be constructed of a single output device or may be constructed of multiple output devices of the same type or different types. The multiple output devices may be provided integrally or may be provided separately.

<Operation of Controller>

FIG. 4 is a flowchart illustrating operation of the controller in the driver-assistance system according to the embodiment of the present invention.

The controller 60 repeatedly executes processing in FIG. 4 during the adaptive cruise operation.

(Control Amount Setting Step)

In step S1, the control amount setting section 63 of the controller 60 sets the control amount for generating the desired automatic acceleration or the desired automatic deceleration on the motorcycle 100.

(Relevant Information Acquisition Step)

In step S2, the relevant information acquisition section 65 of the controller 60 acquires the information relevant to the automatic deceleration generated on the motorcycle 100.

(Notification Control Step)

In step S3, the notification control section 66 of the controller 60 determines whether the information relevant to the automatic deceleration, which is acquired in step S2, satisfies the determination criteria. If it is determined YES in step S3, in step S4, the notification control section 66 outputs the signal that makes the notification device 70 execute the notification operation.

(Execution Step)

In step S5, the execution section 64 of the controller 60 operates each of the components of the driver-assistance system 10 with the control amount set in step S1, and makes the motorcycle 100 execute the automatic acceleration or the automatic deceleration.

<Effects of Driver-Assistance System>

A description will be made on effects of the driver-assistance system according to the embodiment.

In the driver-assistance system 10, the controller 60 includes: the relevant information acquisition section 65 that acquires the information relevant to the automatic deceleration generated during the adaptive cruise operation; and the notification control section 66 that makes the notification device 70 execute the notification operation to the rider in the case where the information relevant to the automatic deceleration, which is acquired by the relevant information acquisition section 65, satisfies the determination criteria. That is, even in the case where such a magnitude of the automatic deceleration that causes the rider to feel uncomfortable is generated on the motorcycle 100 during the adaptive cruise operation, it is possible to reduce the negative influence on the comfort actually received by the rider by improving predictive performance realized by the notification operation of the notification device 70. Thus, in the adaptive cruise operation, the motorcycle 100 can be decelerated in various modes. Therefore, it is possible to appropriately assist with the operation by the rider.

Preferably, in the driver-assistance system 10, the information relevant to the automatic deceleration includes the deceleration of the motorcycle 100 in the automatic deceleration generated during the adaptive cruise operation. For example, in the case where the deceleration is higher than the reference value, the notification control section 66 preferably makes the notification device 70 execute the notification operation. Alternatively, for example, in the case where the change amount of the deceleration is larger than the reference value, the notification control section 66 preferably makes the notification device 70 execute the notification operation. With such a configuration, even in the case where the behavior of the motorcycle 100 has to be controlled by such automatic deceleration that generates the deceleration or the change amount of the deceleration with which the rider feels uncomfortable during the adaptive cruise operation, the rider is urged to be prepared in advance. Therefore, it is possible to reduce the negative influence on the comfort actually received by the rider.

Preferably, in the driver-assistance system 10, the information relevant to the automatic deceleration includes the pitch angle or the pitch angular velocity of the motorcycle 100 in the automatic deceleration generated during the adaptive cruise operation. For example, in the case where the pitch angle or the pitch angular velocity is larger than the reference value, the notification control section 66 preferably makes the notification device 70 execute the notification operation. Alternatively, for example, in the case where the change amount of the pitch angle or the pitch angular velocity is larger than the reference value, the notification control section 66 preferably makes the notification device 70 execute the notification operation. With such a configuration, even in the case where the behavior of the motorcycle 100 has to be controlled by such automatic deceleration that generates one of the pitch angle and the pitch angular velocity or one of the change amount of the pitch angle and the change amount of the pitch angular velocity with which the rider feels uncomfortable during the adaptive cruise operation, the rider is urged to be prepared in advance. Therefore, it is possible to reduce the negative influence on the comfort actually received by the rider.

Preferably, in the driver-assistance system 10, the information relevant to the automatic deceleration includes the peripheral environment information of the motorcycle 100 that influences the automatic deceleration generated during the adaptive cruise operation. For example, the peripheral environment information includes the information on the lit state of the brake lamp of the preceding vehicle. With such a configuration, even in the case where the behavior of the motorcycle 100 has to be controlled by such automatic deceleration that causes the rider to feel uncomfortable during the adaptive cruise operation, the rider recognizes the need for the automatic deceleration and is urged to be prepared in advance. Therefore, it is possible to reduce the negative influence on the comfort actually received by the rider.

Preferably, in the driver-assistance system 10, the notification operation does not exert the external force on the rider. With such a configuration, it is possible to suppress the notification operation from having the negative influence on the operation by the rider.

Preferably, in the driver-assistance system 10, the notification operation is the operation that exerts the external force on the rider. With such a configuration, the rider is reliably notified.

The description has been made so far on the embodiment. However, the present invention is not limited to the description of the embodiment. For example, only a part of the embodiment may be implemented, or an order of the steps may be changed.

REFERENCE SIGNS LIST

1: Trunk
2: Handlebar
3: Front wheel
3a: Rotor
4: Rear wheel
4a: Rotor
10: Driver-assistance system
11: Front brake operation section
12: Front-wheel brake mechanism
13: Rear brake operation section 14: Rear-wheel brake mechanism
21: Master cylinder
22: Reservoir
23: Brake caliper
24: Wheel cylinder
25: Brake pad
26: Primary channel
27: Secondary channel
28: Supply channel
31: Inlet valve
32: Outlet valve
33: Accumulator
34: Pump
35: First valve
36: Second valve
41: Front-wheel rotational frequency sensor
42: Rear-wheel rotational frequency sensor
43: Distance measurement sensor
44: Image sensor
45: Inertial measurement unit
50: Hydraulic pressure control unit
51: Base body
60: Controller
61: Follow-up vehicle identification section
62: Vehicle position information acquisition section
63: Control amount setting section
64: Execution section
65: Relevant information acquisition section
66: Notification control section
70: Notification device
100: Motorcycle

The invention claimed is:

1. A driver-assistance system (10) used for a motorcycle (100), the driver-assistance system (10) comprising:
an electronic processor configured to:
set a control amount in an adaptive cruise operation in which the motorcycle (100) travels at a speed corresponding to an inter-vehicular distance from said motorcycle (100) to a preceding vehicle;
make the motorcycle (100) execute the adaptive cruise operation corresponding to the control amount;
acquire information indicating a degree of automatic deceleration of the motorcycle (100), a pitch angle of the motorcycle (100) generated by the adaptive cruise operation, a pitch angular velocity of the motorcycle (100), and/or a lit state of a brake lamp of the preceding vehicle, the information being generated during the adaptive cruise operation; and
make a notification device (70) execute a notification operation to a rider based on the degree of automatic deceleration of the motorcycle (100), the pitch angle of the motorcycle (100), the pitch angular velocity of the motorcycle (100), and/or the lit state of a brake lamp of the preceding vehicle detected during the adaptive cruise operation.

2. The system according to claim 1, wherein the electronic processor makes the notification device (70) execute the notification operation in the case where the degree of automatic deceleration is higher than a reference value.

3. The system according to claim 1, wherein the electronic processor makes the notification device (70) execute the notification operation in the case where the pitch angle or the pitch angular velocity is higher than a reference value.

4. The system according to claim 1, wherein electronic processor makes the notification device (70) execute the notification operation in the case where a change amount of the pitch angle or the pitch angular velocity is larger than a reference value.

5. The system according to claim 1, wherein the notification operation does not exert an external force to the rider.

6. The system according to claim 1, wherein the notification operation exerts an external force to the rider.

7. A driver-assistance system (10) used for a motorcycle (100), the driver-assistance system comprising:
the electronic processor according to claim 1; and
the notification device (70).

8. The system according to claim 1, wherein the electronic processor makes the notification device (70) execute the notification operation in the case where a change amount of the degree of automatic deceleration is larger than a reference value.

9. A control method for a driver-assistance system (10) used for a motorcycle (100), the control method comprising:
a control amount setting step (S1) of setting a control amount in an adaptive cruise operation in which the motorcycle (100) travels at a speed corresponding to an inter-vehicular distance from said motorcycle (100) to a preceding vehicle; and
an execution step (S5) of making the motorcycle (100) execute the adaptive cruise operation corresponding to the control amount set in the control amount setting step (S1), and further comprising:
an information acquisition step (S2) of acquiring information indicating a degree of automatic deceleration of the motorcycle (100) generated by the adaptive cruise operation, a pitch angle of the motorcycle (100) a pitch angular velocity of the motorcycle (100), and/or a lit state of a brake lamp of the preceding vehicle, the information being generated during the adaptive cruise operation; and
a notification control step (S3, S4) of making a notification device (70) execute a notification operation to a rider based on the degree of automatic deceleration of the motorcycle (100), the pitch angle of the motorcycle (100), the pitch angular velocity of the motorcycle (100), and/or the lit state of a brake lamp of the preceding vehicle detected, which is acquired in the relevant information acquisition step (S2), during the adaptive cruise operation.

* * * * *